(12) United States Patent
Novik et al.

(10) Patent No.: US 7,778,963 B2
(45) Date of Patent: Aug. 17, 2010

(54) CONSTRAINT-BASED CONFLICT HANDLING FOR SYNCHRONIZATION

(75) Inventors: Lev Novik, Bellevue, WA (US); Muhunthan Sivapragasam, Kirkland, WA (US); Shaoyu Zhou, Issaquah, WA (US); Vivek Jawahir Jhaveri, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 741 days.

(21) Appl. No.: 11/114,519

(22) Filed: Apr. 26, 2005

(65) Prior Publication Data
US 2006/0242444 A1   Oct. 26, 2006

(51) Int. Cl.
*G06F 7/00* (2006.01)

(52) U.S. Cl. ........................................ 707/610; 707/626
(58) Field of Classification Search ........................ None
See application file for complete search history.

(56) References Cited

U.S. PATENT DOCUMENTS

| | | | | |
|---|---|---|---|---|
| 5,588,147 A | * | 12/1996 | Neeman et al. | 1/1 |
| 5,870,765 A | * | 2/1999 | Bauer et al. | 707/203 |
| 6,098,079 A | * | 8/2000 | Howard | 707/205 |
| 6,725,262 B1 | * | 4/2004 | Choquier et al. | 709/221 |
| 6,820,088 B1 | * | 11/2004 | Hind et al. | 707/101 |
| 6,993,522 B2 | * | 1/2006 | Chen et al. | 707/7 |
| 7,289,973 B2 | * | 10/2007 | Kiessig et al. | 707/1 |
| 7,401,104 B2 | * | 7/2008 | Shah et al. | 707/204 |
| 7,716,313 B2 | * | 5/2010 | Rana et al. | 709/223 |
| 2004/0181773 A1 | * | 9/2004 | Mortensen et al. | 717/101 |
| 2005/0055380 A1 | * | 3/2005 | Thompson et al. | 707/200 |
| 2005/0192973 A1 | * | 9/2005 | Sperling et al. | 707/100 |

* cited by examiner

*Primary Examiner*—Neveen Abel Jalil
*Assistant Examiner*—Kellye D Buckingham
(74) *Attorney, Agent, or Firm*—Workman Nydegger

(57) ABSTRACT

The subject invention pertains to data synchronization across replicas. Disclosed are systems and methods of detecting and handling constraint-based conflicts that occur during a synchronization session. In accordance with one particular aspect of the invention, name-constraint violations can be detected. These violations can be resolved by generating a single merged identity that can be utilized to refer to data units, for example on different replicas that had the same name. A property of the merged identity can be merge history, which specifies the identifiers subsumed by the merge.

13 Claims, 21 Drawing Sheets

Replica A (11)
B15C8

X (GID:Ga,
LUV:A11)

Replica B (16)
A10C8

X (GID:Gb,
LUV:B16)

Replica C (9)
A11B16

X (GID:Ga,
MH:{{Ga, {A11}},
{Gb, {B16}}},
LUV:C9)

Fig. 14c

CONSTRAINT-BASED CONFLICT HANDLING FOR SYNCHRONIZATION

TECHNICAL FIELD

The subject invention relates generally to computers and more particularly toward synchronization of data replicas.

BACKGROUND

Individuals these days employ a myriad of computer devices or systems on a regular basis. For example, individuals can have a desktop computer and/or associated file server with which they interact at work. They can also have a laptop computer for working away from the office as well as one or more desktop computers at home. Furthermore, they may have palm-top computers such as a personal digital assistant (PDA), pocket PCs, mobile phones and/or other portable devices they utilize for organizational, communication, and/or entertainment purposes. It is typically desirous for at least some data to be copied to multiple devices to enable convenient access thereto. For instance, often a user copies files from a desktop computer or file server to a portable computer or device for use while the user is away from their office. The user then likely modifies or adds some new files while away from the office and subsequently needs to copy these files to their desktop computer or file server when they return to the office. Similarly, users may wish to copy pictures or music from one device to another (e.g., computer to MP3 player, digital camera to computer . . . ). Still further yet, users may demand that personal preferences and contacts (e.g., address book) be maintained across all or a subset of their computers. Thus, certain files need to be synchronized across multiple computers or devices.

In its simplest form, synchronization is merely the task of causing designated files from multiple devices or systems to become the same or consistent. Typically, this means that the most up to data file versions are used to copy to a store. This process is automated by two-way, peer-to-peer, synchronization software applications. In particular, upon activation, a synchronization application can detect file changes or additions on a first device and copy or replicate new and/or altered files to a second device communicatively coupled to the first device, for instance via a hardwired or wireless connection. This causes the files on the first device to be synchronized with files on the second device. Synchronization can also be performed remotely by accessing a network having a first device such as desktop computer coupled thereto. A second device such as a second desktop computer or laptop computer can be synchronized with the first device utilizing synchronization software.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns synchronization of data entities in view of data store constraints including but not limited to name constraints. Data stores or synchronization replicas typically impose a number of constraints for storage of data thereon. One of those constraints is typically that data entities cannot have the identical name in the same namespace under the same parent entity. For example, two data entities such as files cannot have identical names within the same container or folder. During a synchronization operation, data items or changes thereto are copied from one replica to another. However, this can be problematic if the entity a synchronization operation is attempting to write already exists on the replica. In other words, there is a name collision.

Constraint-based collisions such as name collisions can be resolved in a multitude of different ways. According to an aspect of the subject invention, systems and method provide for merging conflicting data entities such that conflicting entities can be treated as the same entity. Thus, conflicting folders are treated as the same folder and their contents merged, while conflicting folder items or files can be treated as the same by ensuring that only one is present. In accordance with another aspect of the subject invention, one of the conflicting entities can be renamed thereby avoiding any conflict. For example, if each of two replicas has a "Documents and Settings" folder, then one of them can be renamed, for instance, "Documents and Settings 1." According to another aspect of the subject invention, the conflicts can be logged and a user or other computing entity can later resolve the conflict.

In accordance with a particular aspect of the invention, systems and methods are provided for detecting and processing temporary conflicts such as those generated with respect to cyclic renames. For example, cyclic renames can be detected by analyzing the knowledge of a synchronization partner from which changes are being applied to another partner. In particular, a check can be made to determine if a sending partner was aware of the present version on a receiving partner. If it was aware, then the conflict is a temporary conflict. The resolution of temporary conflicts such as cyclic names can entail utilization of temporary names during application and reverting to the designated names.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIGS. 14a-c present a graphical representation of an exemplary merge scenario in accordance with an aspect of the subject invention.

DETAILED DESCRIPTION

Figure 1:
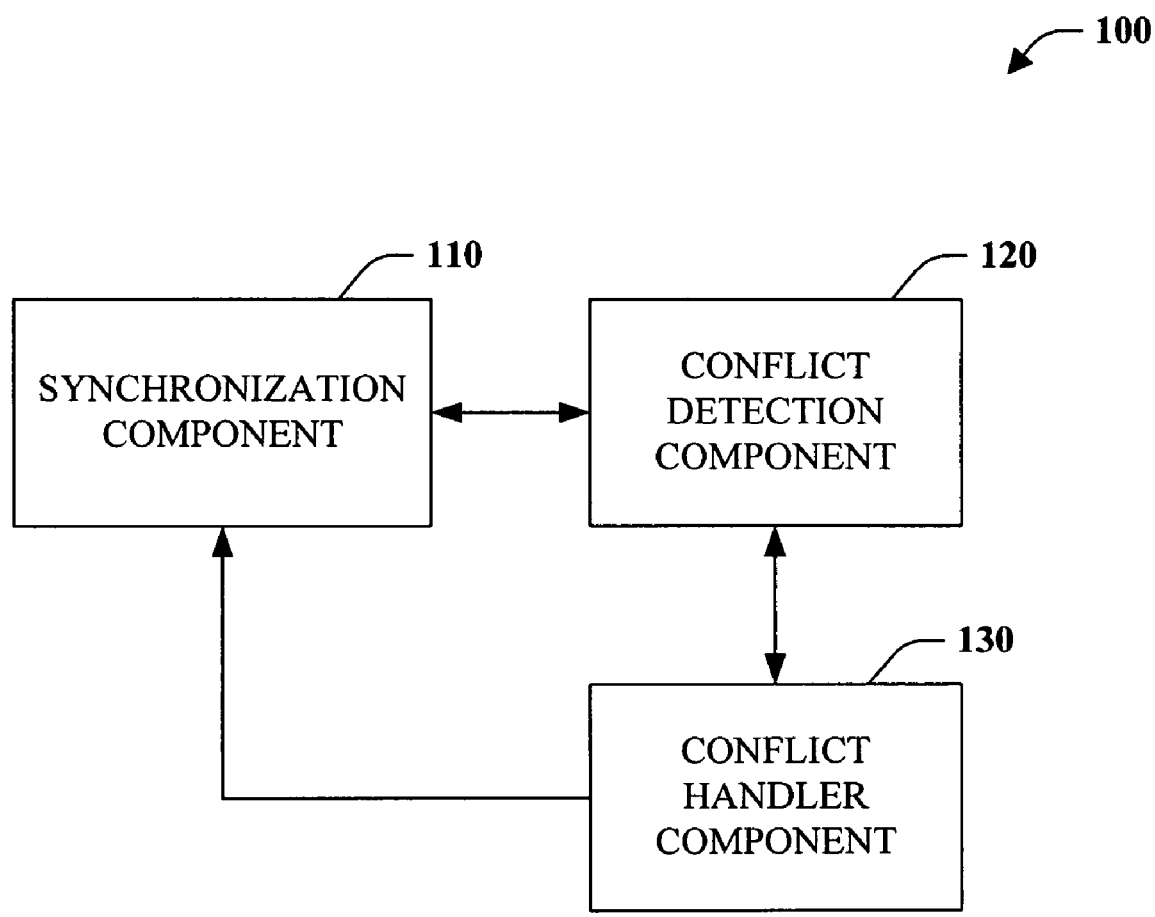
FIG. 1 is a block diagram of synchronization system in accordance with an aspect of the subject invention.

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

The term "data unit," "entity" or "data entity" as employed herein is intended to refer to a generic discrete unit of storable data that can be manipulated by hardware, software, firmware, or a combination thereof. Such data units or entities are stand-alone objects that can be stored, retrieved, copied, deleted, moved, opened, printed, backed up, and restored, among other things. By way of example, a data unit or entity can correspond to a file, directory, or other data container. Storage of such data can be on any computer readable medium including but not limited to a computer hard drive or data store. Data units or entities can include items.

The term "item" as used herein is a specialized discrete unit of data storable on a data store, which can be manipulated by hardware, software, or a combination of hardware and software. Similar to data units or entities, items are stand-alone objects that can be stored, retrieved, copied, deleted, moved, opened, printed, backed up, and restored, among other things. An item can be a regular non-file-backed item or a file-backed item. A non-file-backed item, or simply an item, is a schematized object that can comprise one or more elements and relationships. An element is an instance of a type comprising one or more fields, also referred to herein as a property. A relationship is a link between two or more items. A file-backed item acts as a bridge between legacy data units or file formats and the richly schematized item. In particular, the file-backed item can include metadata associated with a file as well as the file stream itself.

Artificial intelligence based systems (e.g., explicitly and/or implicitly trained classifiers) can be employed in connection with performing inference and/or probabilistic determinations and/or statistical-based determinations as in accordance with one or more aspects of the subject invention. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Turning initially to FIG. 1, a synchronization system 100 in illustrated in accordance with an aspect of the subject invention. System 100 includes a synchronization component 110, a conflict detection component 120, and a conflict handler component 130. Synchronization component 110 synchronizes two or more data entities. In particular, synchronization component 110 can detect changes to an entity and update a replica thereof to be consistent with the changed entity. This can be accomplished by comparing the knowledge of a replica, that documents the versions that the replica is aware of with the current version or knowledge of another replica. Discrepancies can be remedied by transmitting or enumerating changes to replicas to ensure that the replicas are consistent. Conflict detection component 120 detects or identifies conflicts or violations during a synchronization session.

According to an aspect of the subject invention, conflict detection component 120 detects constraint-based conflicts, although it is not limited thereto. A constraint-based conflict is different from a knowledge conflict. A knowledge conflict occurs when two independent changes are made to the same change unit in the same data entity. When synchronized, a conflict can be raised due to the independent changes. This can be resolved by supplying the value to utilize, which could be one of the supplied values or a completely different value. A constraint-based conflict is not caused solely by independent changes to the same change unit. It is caused by an attempt being made to apply a change on a replica that violates a store constraint including but not limited to a uniqueness constraint. One reason why an attempt to apply changes to a replica could fail is due to the fact on the send the constraint was not violated since some of the changes present on the receiving replica are not present at the sending replica. A second reason why an attempt to apply changes would fails is caused by different constraints on different stores. A violation can also occur based on different constraints on different stores. A uniqueness constraint violation can occur due to the former reason, unless two stores are of different types with one not having the same uniqueness requirements, which corresponds to the second reason. Consider an example where, a property has a constraint that it is different on the replicas. A value can be set to a valid value on one replica, but when synchronization tries to set that same value on another replica it fails. In another example, a container, such as a folder, can be present on two different synchronization replicas and have the same name on both replicas. When synchronized, an attempt could be made to create each other's folder. However, the attempt would fail, because the store does not allow two folders of the same name with the same parent folder or container. In yet another example, a store may disallow multiple files with the same name in the same folder. If two files were created with the same namespace name in the same folder, then upon synchronization application of the change for these files would fail. Conflict detection component 120 is communicatively coupled to the conflict handler component 130.

Conflict handler component 130 provides corrective action to resolve or otherwise handle the problem(s) detected by the conflict detection component 120. Handler component 130 receives information regarding a detected conflict or violation from conflict detection component 120. Upon receipt of such information, handler component can determine a proper action. This action can be communicated to the synchronization component 110 for execution thereby, executed by the handler component 130 or a combination thereof. By way of example and not limitation, the handler component 130 can log the conflict for later resolution, supply a value(s) that do not cause a violation, and/or merge items in conflict such that the data units are the same as far as the synchronization component is concerned.

Figure 2:
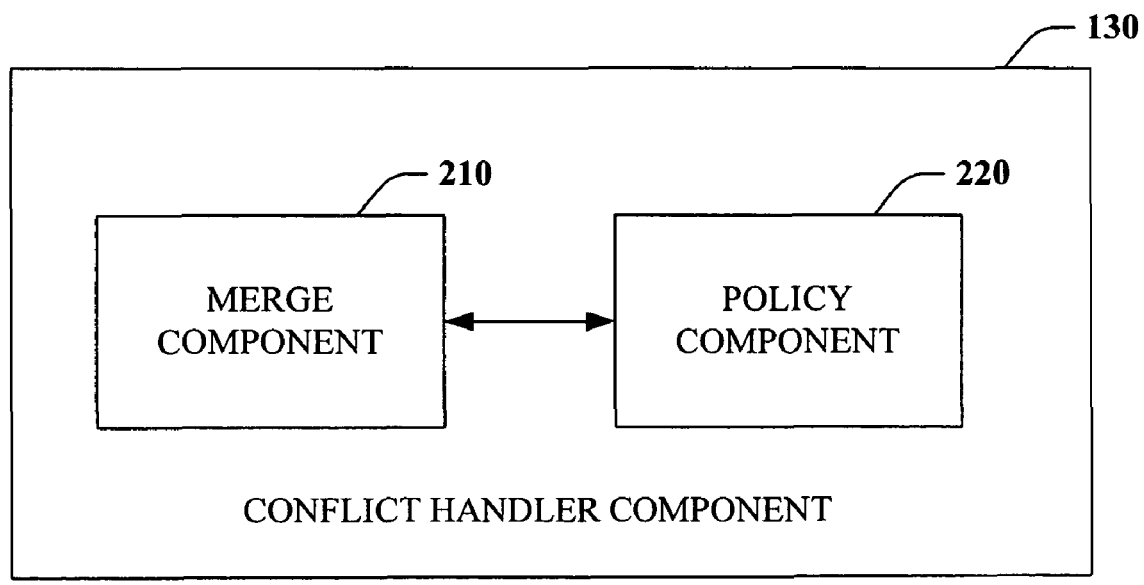
FIG. 2 is a block diagram of a conflict handler component in accordance with an aspect of the subject invention.

FIG. 2 depicts a conflict handler component 130 in accordance with an aspect of the subject invention. Handler component 130 can include a merge component 210 and a policy component 220. Merge component 210 enables a synchronization component or session to treat multiple entities known by different global ids, for instance, as the same. In essence, multiple entities can be merged and these merged entities can be referred to by a single global id. In particular, a single merge identifier such as a global id can be utilized to reference a plurality of data units or entities. For instance, a global id can be mapped to a myriad of local ids employed by individual replica stores. In this manner, data entities that employ the same name can be synchronized as the same entity. Furthermore, the merged entities that the single merge identifier references can be specified as a metadata or a property of the merge identifier, such as merge history. This is advantageous over simply carrying a set of identifiers, as only a single identifier would need to be transmitted during most of a synchronization process rather than an entire set. Policy component 220 can specify what the merge identifier should be for a given situation. For example, the policy component could specify that a merge identifier should be a new global identifier or one of the identifiers being merged. The policy component could specify that a merge identifier should be chosen based on the policies such as local identifier wins, remote identifier wins, most recent identifier wins, and the like. For example, in a policy were the local identifier wins, there are two global ids G1 and G2, and synchronization is occurring from G1 to G2, then G1 can be chosen as the merge identifier, which encompasses both G1 and G2. Thus, handler component 130 can be driven by policy, in particular via policy component 220.

Figure 3:
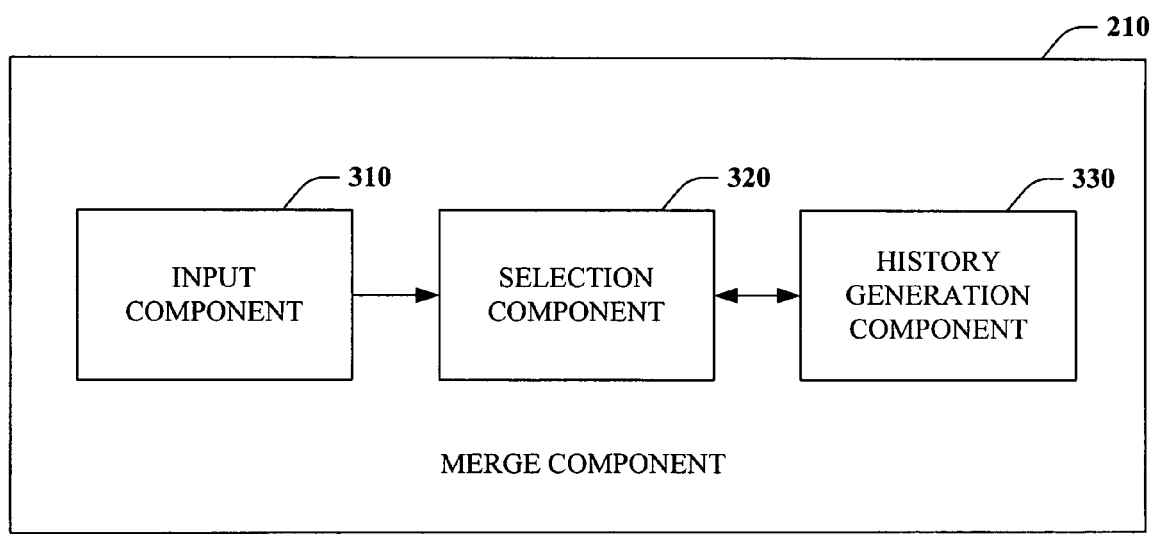
FIG. 3 is a block diagram of a merge component in accordance with an aspect of the subject invention.

FIG. 3 depicts a merge component 210 in accordance with an aspect of the subject invention. As illustrated, merge component 210 includes an input component 310, a selection component 320 and a history generation component 330. Input component 310 receives and/or retrieves identifiers associated with or related to data entities with colliding names, for example. Input component is communicatively coupled to selection component 320. Selection component 320 selects one of the received/retrieved identifiers or a new identifier as a merge identifier, which is a single global identifier referencing two or more data replicas on a plurality of stores. Selection of the merge identifier is based at least in part upon merge conflict policy information received and/or retrieved by the selection component 320. It should be appreciated that the selection component 320 can retrieve such information (e.g., contents/property values) that will represent multiple data entities that existed on different systems from an application. Upon selection of a merge identifier, history generation component 330 can generate a merge history property or metadata that includes the identifiers subsumed by the merge identifier. Thus, there were two data entities G1 and G2 and G1 is selected as the merge identifier base on a conflict policy, then the merge history property or metadata generated by history generation component 330 would include both G1 and G2.

By way of example, assume a user desires to synchronize two computers. In particular, the user desires to synchronize a standard "Documents and Settings" folder that exists on both machines. When synchronization occurs for the first time one machine will receive a folder that that already exists on the machine. Thus, there is a collision. Although a user could be queried to resolve the conflict, this would provide a poor user experience. Thus, the expectation is that that conflicting entities should be treated the same. In this example, the "Documents and Settings" folders should be treated as the same. That is, the folders should be merged. For purposes of synchronization, a unique global identifier (id) is assigned to each existing entity for use by partners (e.g., synchronized computer systems or devices) to reference the entity. In this example, both folders will have a global id associated therewith. Merge component 210 can provide a single merged identifier or global id for referencing both folders. In this way, there is a unique way of identifying the merged entities.

Merging the folders also merges the contents of the folders. Metadata can then be associated with the single merge identifier including identification of the merged items, for example by global id. The merge therefore eliminates name collisions by treating data entities such as folders the same. Furthermore, storage of the global ids of each merged entity as metadata such as a merge history property avoids having to exchange all the identifiers every time synchronization is performed. Such information need only be sent the first time after the merge and thereafter only if there is a change thereto.

It should also be appreciated that merges can collide when synchronizing stores that have previously been merged independent of one another. In such a situation, a policy can be provided that deterministically selects one of the merge ids to be the new aggregate merge id and the merge histories can be combined. Exemplary scenarios hare provided in later sections that can clarify the operation of the subject invention in this particular situation.

Figure 4:
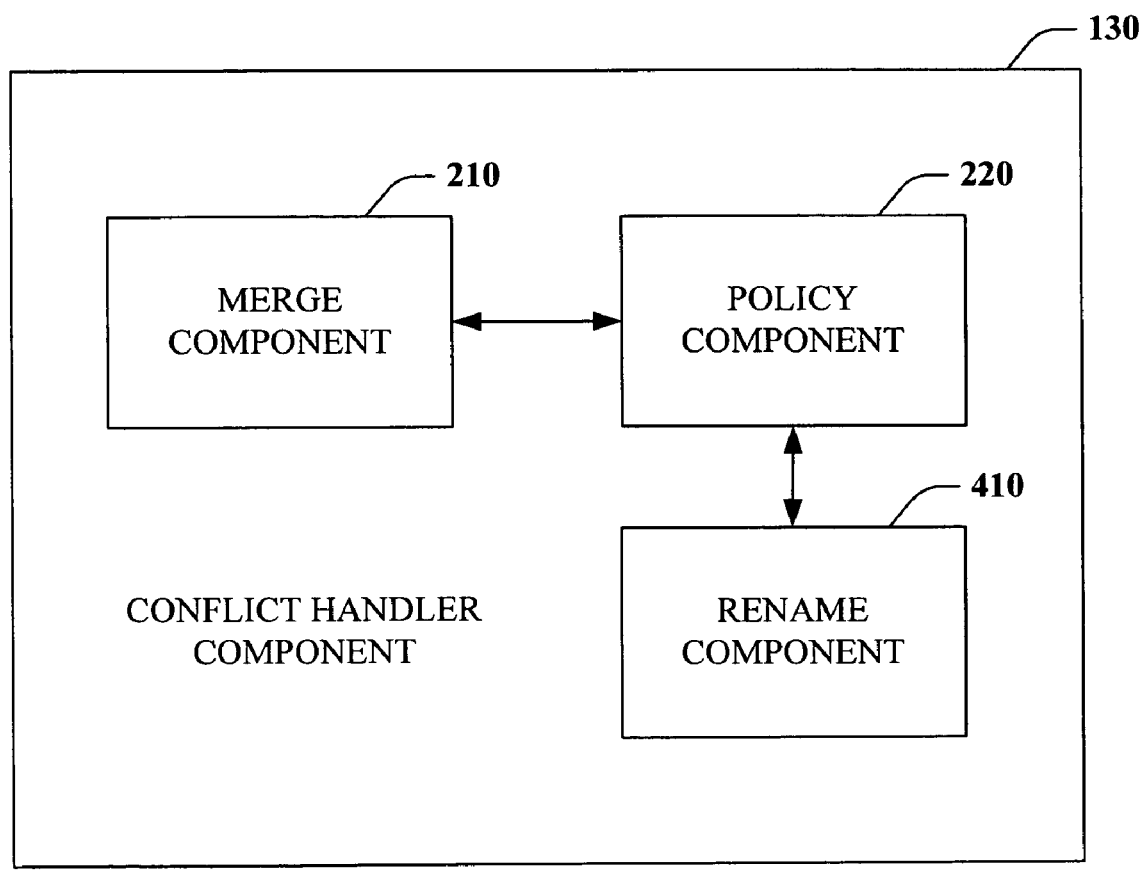
FIG. 4 is a block diagram of a conflict handler component in accordance with an aspect of the subject invention.

Turing to FIG. 4, a conflict handler component 130 is illustrated in accordance with an aspect of the subject invention. Similar to handler component 130 of FIG. 2, handler component 130 can include merge component 210 and policy component 220. Furthermore, handler component 130 can include rename component 410. As described supra, merge component 210 enables a synchronization component or session to treat multiple entities as the same. More specifically, a single merge identifier such as a global id can be utilized to reference a plurality of data units or entities. In this manner, data entities that employ the same name can be synchronized as the same entity. Furthermore, the merged entities that the single merge identifier references can be specified as a metadata or a property of the merge identifier, such as merge history. Policy component 220 can specify what the merge identifier should be for a given situation. The policy component 220 could specify that a merge identifier should be chosen based on the policies such as local identifier wins, remote identifier wins, most recent identifier wins, and the like. Alternatively, the merge identifier that is kept or chosen can be done deterministically rather than driven from policy. This can guarantee convergence of changes when more synchronization operations are performed. However, merging identifiers is not the only way to deal with constraint-based collisions. Rename component 410 can rename one or more data entities to avoid name collisions or violations. Furthermore, such data entities can be renamed deterministically. In the above example, where two "Documents and Settings" folders are being synch, rename component 410 can rename one of the folders such as "Documents and Settings 1." In addition to specifying policies for the merge component 210, policy component 220 could also specify, among other things, policies regarding renaming of entities. For example, it could specify whether local or remote entities should be renamed by rename component 410. Furthermore, while rename component 410 can be employed in place of the merge component 210 it can also be utilized in conjunction with the merge component 410, for instance based on the situation and/or data identity type, policy component can specify and enforce utilization of merge component 210 and/ or rename component 410. By way of example, data entities of type folder or container could be merged with other types, for instance, a file contained therein could be renamed, or vice versa. Furthermore, it should be appreciated that rename component 410 can be employed to temporarily rename data entities with respect to cyclic renames as described in later sections.

Figure 5:
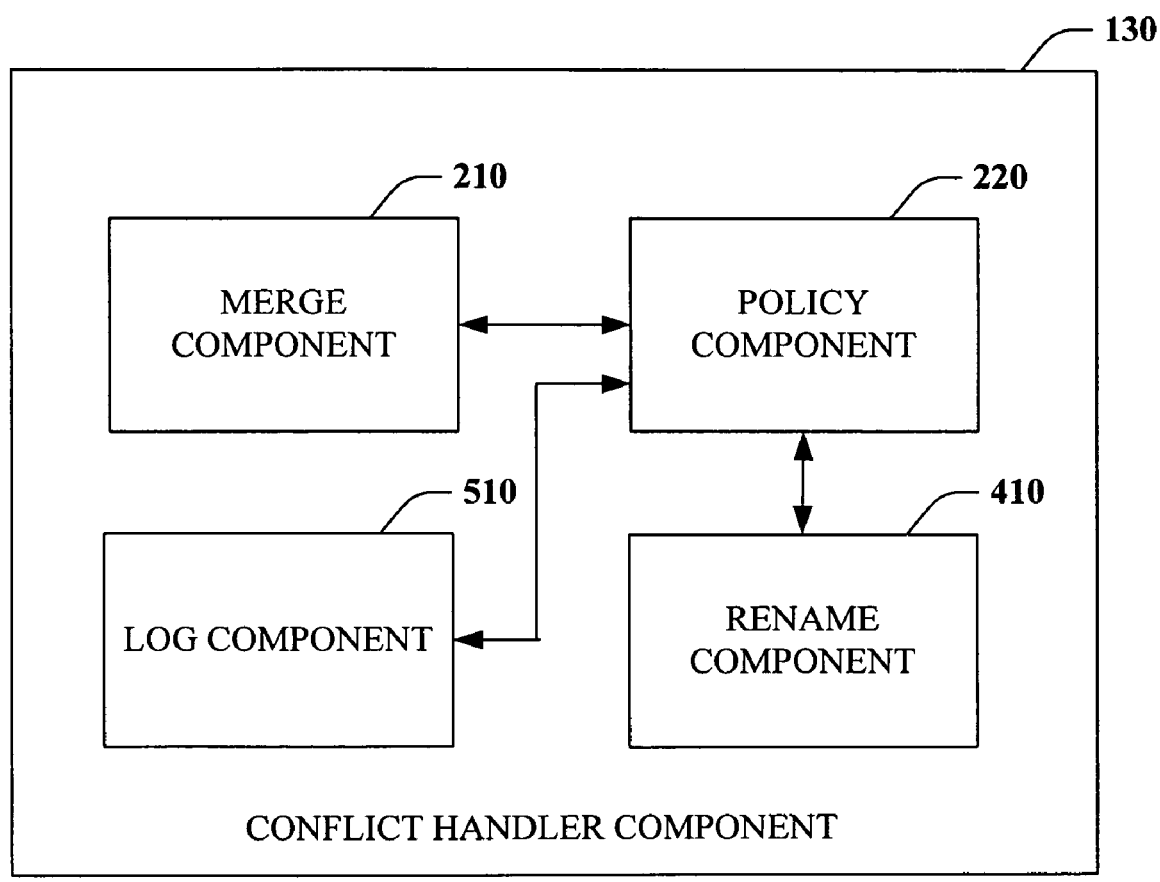
FIG. 5 is a block diagram of a conflict handler component in accordance with an aspect of the subject invention.

FIG. 5 depicts a conflict handler component 130 in accordance with another aspect of the subject invention. Handler component 130 includes a merge component 210, policy component 220, rename component 410 and log component 510. As described previously, merge component 210 can enable multiple items to be treated the same by generating a merge identifier that encompasses or subsumes other individual identifiers. The subsumed identifiers can then be added as a property of metadata to the merge identifiers. The rename component 410 can rename one or more data items to avoid name collisions. Policy component 220 can select and provide a handing policy to either or both of merge component 210 and rename component 410. In accordance with another aspect of the subject invention, handler component 130 can include a log component 510. Log component 510 can log a conflict for later resolution. The log component can write data entities to a computer readable medium such as a disk or memory for later retrieval and resolution. If there are layers of items, some may need to be logged while others are dealt with. For example, if the data entity in conflict is a folder or container, then all the child data units also need to be considered. Accordingly, child items can be logged and later evaluated to determine if there is a conflict. Furthermore, the log component 510 can also simply log the conflict and allow a user or other system to specify how it should be resolved. In sum, merge component 210, rename component 410, and log component 510 are all provide for conflict handling. However, merge component 210 and rename component 410 are resolution components, whereas, log component 510 is not. Log component 510 writes to a log for later review.

Figure 6:
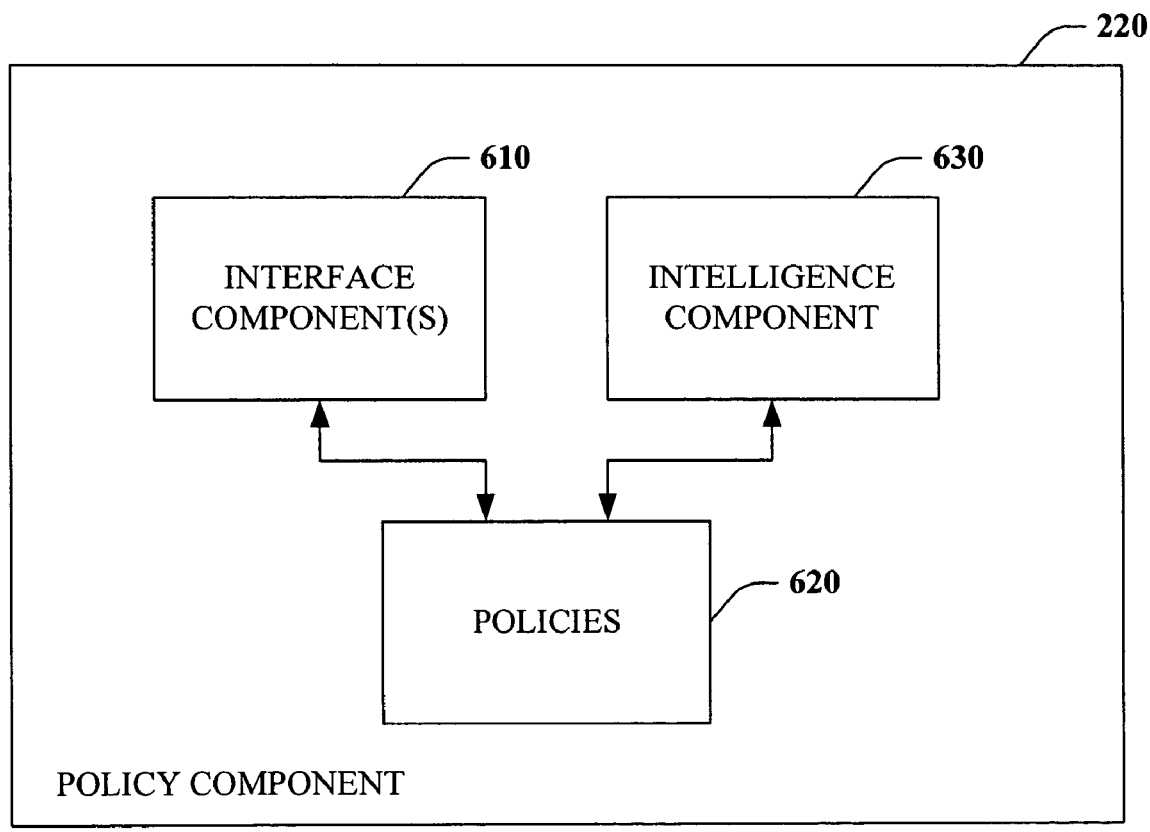
FIG. 6 is a block diagram of a policy component in accordance with an aspect of the subject invention.

FIG. 6 illustrates a policy component 220 in accordance with an aspect of the subject invention. Policy component 220 can include interface component(s) 610, polices 620, and intelligence component 630. Interface component 610 provides a mechanism for transmission of policies 620. Policies 620 can specify rules pertaining to particular situations. More specifically, policy can specify which conflict handlers should be employed to process a conflict. For example, polices 620 can specify that a local global id should be selected as a merge identifier or that remote data entities should be renamed. Furthermore, policies 620 can specify whether detected conflicts should be resolved by merging or renaming or alternatively logged. Policies 620 may be stored and retrieved from nonvolatile memory including a computer readable medium. Furthermore, it should be appreciated that policies 620 can be located external to the policy component 120. Interface component 610 enables specification and loading of a policy. For example, interface component 610 can receive input from a user, directly or indirectly, and/or a controlling application that specifies how conflicts are to be resolved or otherwise handled. Such instructions can be stored as policies 620. Furthermore, interface component 610 can be employed to provide policies or policy information to components such as the merge and rename components. Policy component 220 can also include an intelligence component 630. Intelligence component 630 can generate and/or select policies for resolving conflicts. Intelligence component 630 can utilize artificial intelligence, knowledge based or adaptive systems to analyzed conflicts and/or system states to select and/or generate policies. More specifically, intelligence component 630 can infer, as that term is defined herein, an appropriate action or policy based on a given conflict. Furthermore, intelligence component 630 can employ machine learning techniques and technologies to further increase its accuracy over time.

Figure 7:
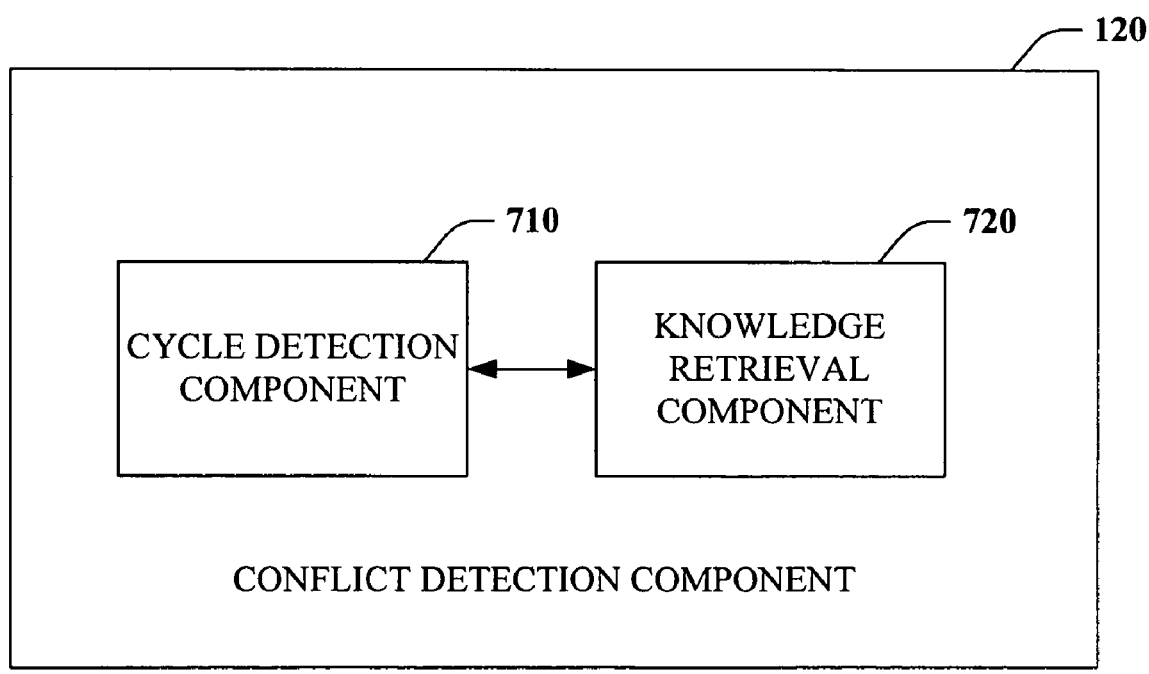
FIG. 7 is a block diagram of a conflict detection component in accordance with an aspect of the subject invention.

FIG. 7 depicts a conflict detection component 120 in accordance with an aspect of the subject invention. Conflict detection component 120 can detect both permanent and temporary conflicts, collisions or violations. A permanent conflict is one where applying a remote change will cause a conflict regardless of the order which changes are applied. A temporary conflict is one due to the order in which synchronization is processing (i.e., enumerate and/or apply) changes. Permanent conflicts can exist, for example, when there two or more data entities with the same name or type. Temporary violations can occur in a several scenarios. In one situation, temporary name constraint violations could arise due to the order in which changes are enumerated or applied. For example, if a relationship or entity with name X gets renamed to Y and a new relationship or entity with the name X is created, a temporary violation could be encountered if the create is enumerated prior to the rename. In another example, where there are three data entities named A, B, and C, a conflict can result during synchronization where entity A renamed to B, entity B is renamed to C and entity C is renamed is A. Conflict detection component 120 includes two components to identify such temporary violations: a cycle detection component 710 and a knowledge retriever component 720.

Cycle detection component 710 can receive an entity to be synchronized with a replica. Detection component 710 is operable to compare the name of the item with other data entities in the same namespace including the same dependency(s) (e.g., parent). If there is an entity in the namespace with the same name and the same dependency(s), then there is a collision. To determine if the violation is temporary or permanent, the detection component 710 needs more information. Accordingly, cycle detection component 710 can request knowledge from the knowledge retrieval component 720. Knowledge retrieval component 720 can retrieve the knowledge associated with the data entity in question from the synchronization partner. Knowledge simply identifies what versions of data entities a partner knows or of which it is aware. This knowledge or version information can be transmitted back from the knowledge retriever component 720 to the cycle detection component 710. Detection component 710 can then compare the knowledge or version information provided with the version of the current version of the entity to be updated. If it is aware of the version then the violation is temporary. However, this assumes the synchronization partner enforces the same constraint(s). Accordingly, the cycle detection component 710 can also check to determine if the synchronization partner has the same constraints. If the synchronization partner has the same constraints, for instance unique names in a namespace, and the partner was aware of the current version of the entity to be updated, then a temporary violation has been detected. If the synchronization partner has the same constraints and it was aware of current version, then cycle detection component can safely assume that there has been a rename and that the violation is only temporary. However, the update cannot be immediately applied because there is a violation.

Conflict detection component 130 can indicate to the handler component 130 of FIG. 1 that a cycle has been detected. The conflict handler component 130 can then allocate and apply the change or update with a temporary name that is different from the all others in the namespace, for example Name.tmp. The temporary name can then be change to the designated name at a later time, for instance upon receipt of the next change entity, or completion of the change cycle. For example, in a name swap situation if entity 1 has a name X, entity 2 has a name Y, and a change is to be applied that changes entity 1 to the name Y, then there is a collision because entity 2 already has the name Y. This change can be applied with a temporary name, for example, entity 1 can be named Z. The next change that arrives is to change the name of entity 2 to X. This change can be applied and subsequently the temporary name Z can be changed to its designated value Y.

As will be appreciated by those artisans of ordinary skill in this field, various portions of the disclosed systems may include or consist of artificial intelligence- or knowledge based components, processes or mechanisms in addition to policy component 220. For example, the conflict detection component 120 of FIG. 1 may use a neural network to facilitate identifying conflicts during synchronization. Furthermore, handler component 130 of FIG. 1 employ classifiers that are explicitly trained, for example, using generic training data, as well as implicitly trained, such as by observing behavior or receiving extrinsic information to infer corrective actions given a detected conflict. For example, SVM's are configured using a learning or training phase within a classifier constructor and feature selection module. Thus, the classifier(s) can be used to automatically perform a number of functions.

The aforementioned system(s) have been described with respect to the interaction between several components. Furthermore, for purposes of clarity and simplicity, the system(s) and portions thereof were provided and described to emphasize an aspect of the subject invention. It should be appreciated that such systems can include those components specified therein, some of the specified components, and/or additional components specified in other systems. For example, conflict handler component 130 can include one or more of merge component 210, rename component 410, and log component 510 alone or in any combination thereof. Additionally, it should be noted that one or more components can be combined into a single component providing aggregate functionality or divided into several sub-components. The components may also interact with one or more other components not specifically described herein but known by those of skill in the art.

In view of the exemplary systems described supra, methodologies that may be implemented in accordance with the present invention will be better appreciated with reference to the flow charts of FIGS. 8-11. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
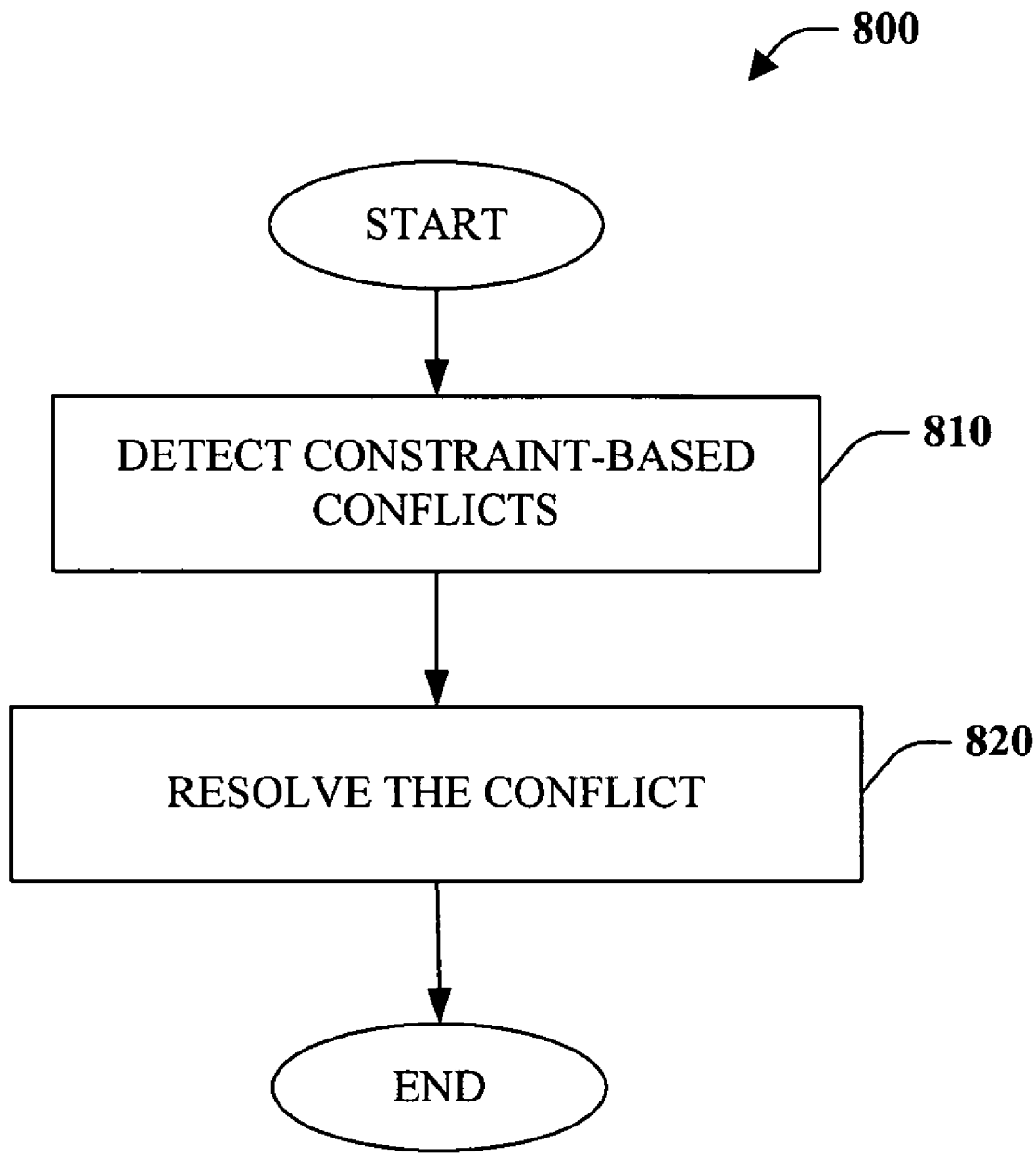
FIG. 8 is flow chart diagram of a synchronization methodology in accordance with an aspect of the subject invention.

Turning to FIG. 8, a synchronization methodology 800 is illustrated in accordance with an aspect of the subject invention. At 810, one or more constraint-based conflicts are detected during a synchronization process, for instance. Constraint-based conflicts are caused by an attempt to apply a change on a replica that violates a store constraint. For instance, one constraint can be that data entities including but not limited to folders, containers, files, and items be unique within their namespace and with respect to any parent entities. By way of example, if a folder is concurrently created on two synchronization replicas and has the same name on both replicas, then when synchronization is initiated an attempt will be made to create each other's folder. The attempt should fail because there cannot be two folders of the same name with the same parent folder. Similarly, an attempt would fail that tries to create a file within a folder where that file and another file within that folder share the same namespace name. At 820, the conflict is resolved or otherwise handled. The conflict can be resolved or handled in a myriad of different ways. For example, the conflict could simply be logged and a user notified, thereby enabling a user to apply a corrective action deemed appropriate for the conflict. However, users often desire automatic conflict resolution. Accordingly, in the name conflict scenario where a synchronization application wished to write a data entity with the same name onto a replica such data entity can by renamed to avoid and thereby avoid the conflict. Additionally or alternatively, data entities can be merged and identified by a single merge identifier.

Figure 9:
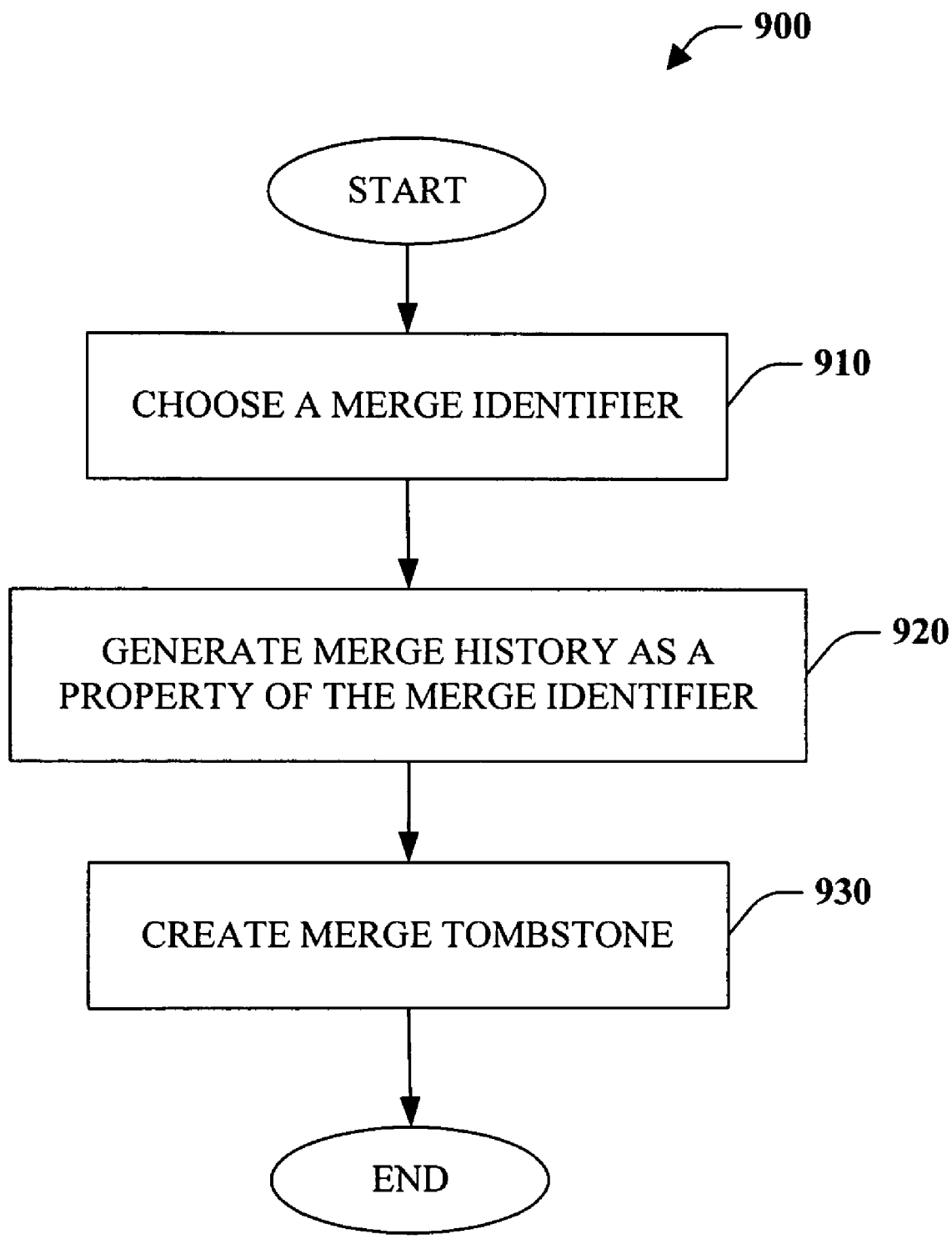
FIG. 9 is a flow chart diagram of a merge methodology in accordance with an aspect of the subject invention.

FIG. 9 illustrates a merge methodology 900 in accordance with an aspect of the subject invention. At 910, a merge identifier is chosen. For example, the global identifier provided by a replica for a data entity to be merged can be selected. Alternatively, a new unique identifier can be generated and selected. At 920, a merge history property is generated as metadata or a property of the merge identifier. The merge history can include, among other things, the identifiers that were merged or subsumed by the merge identifier. Additionally, the merge history can include version information. At 930, a merge tombstone or other indicator can be created or set to indicate that one or more local identifiers have been replaced by a merge identifier.

Figure 10:
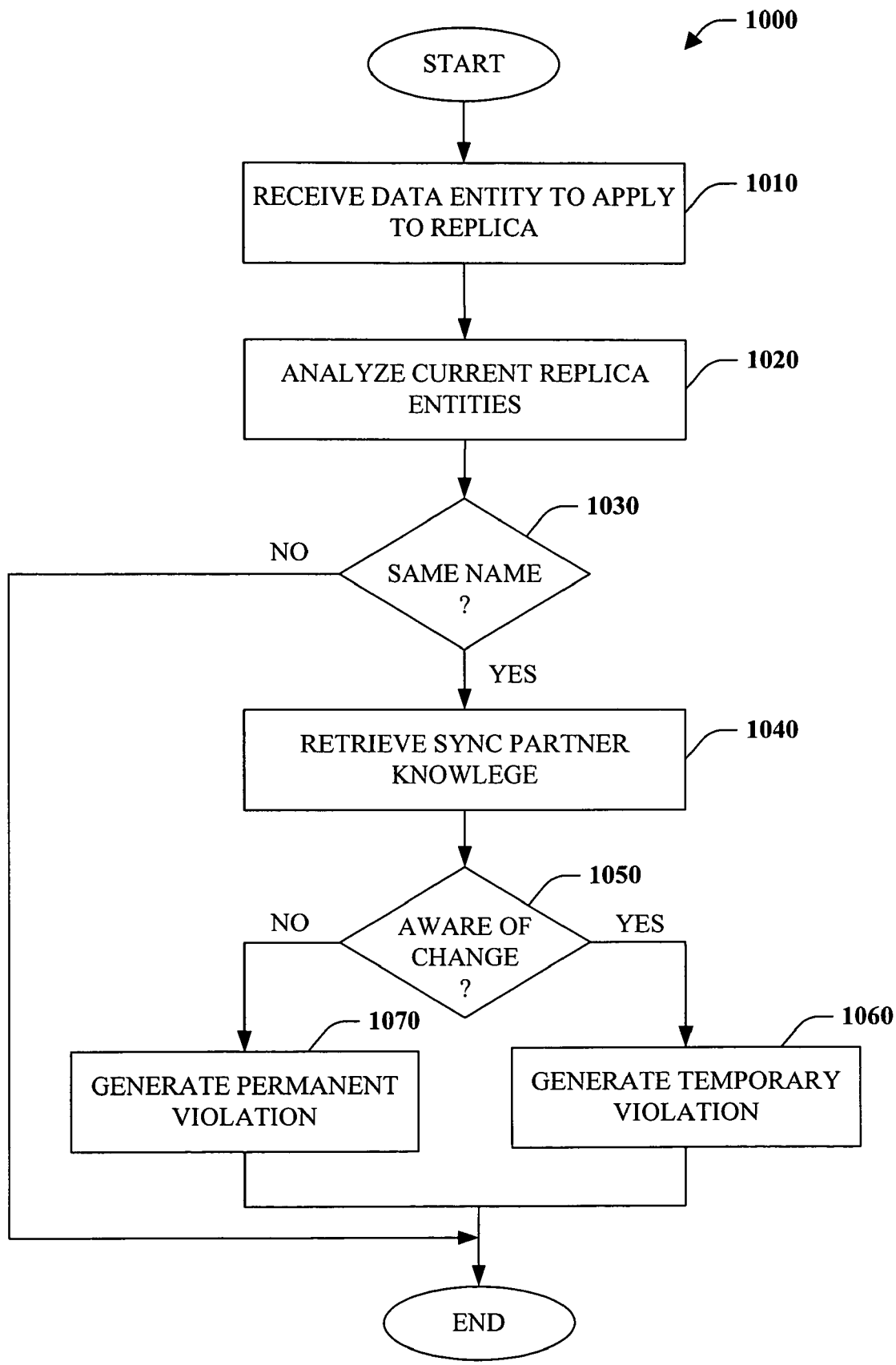
FIG. 10 is a flow chart diagram of a constraint-based conflict detection methodology in accordance with an aspect of the subject invention.

FIG. 10 is a method of constraint-based conflict detection 1000 in accordance with an aspect of the subject invention. In particular, method 1000 corresponds, but is not limited, to naming violations. At 1010, a data entity is retrieved to apply to a replica. At 1020, the names of entities on the store where this is to be saved are analyzed. At 1030, a determination is made as to whether the same name exists within the same namespace and storage locale. For example, if an entity is to be saved in the same folder as another entity with the same name then a violation has occurred. If an entity is not identified with the same name, then no conflict exists and the method can terminate. However, if the same name is found, then the method proceeds to 1040. At 1040, knowledge of the synchronization partner is retrieved or otherwise accessed. At 1050, a determination is made pertaining to whether, based on the knowledge retrieved, the synchronization partner was aware of the present version of the entity. If the partner is aware of the version, then at 1060 a temporary violation is generated. If not, a permanent violation is generated at 1070. It should be noted that the determination at 1050 is premised on the synchronizing partner having the same constraints as the replica store being synchronized. It should be appreciated that this method 1000 could be modified to first detect whether constraints over synchronizing stores are the same. If the synchronizing partner enforces the same constraints and it was aware of the current version being updated, then it is likely that a cyclic rename occurred, which corresponds to a temporary violation. Otherwise, the violation can be classified as permanent.

Figure 11:
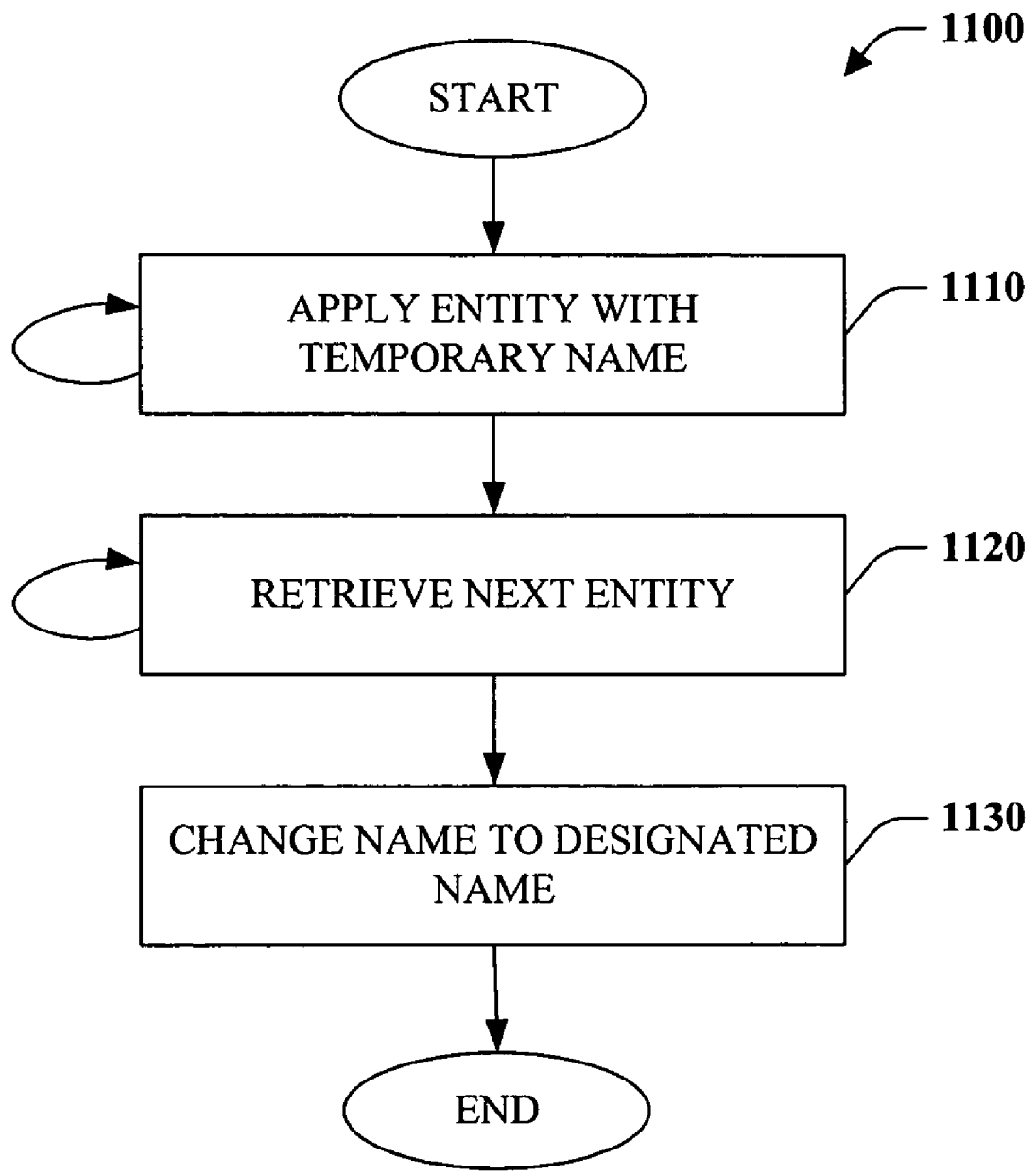
FIG. 11 is a flow chart diagram of a method of resolving temporary violations in accordance with an aspect of the subject invention.

FIG. 11 depicts a method 1100 of resolving a temporary conflict or violation in accordance with an aspect of the subject invention. At 1110, an entity with the same name, for example, is applied with a unique temporary name. For example, in a situation where F1 is named X and F2 is named Y and an attempt has been made to change the name of F1 to Y, a temporary name can be applied like Y.tmp. At 1120, the next data or change entity to be applied is retrieved or received. In the subject example, F2 could be received which is to be renamed X. At 1130, the temporary name can be renamed to its initially designated name. This rename of the temporary name to the designated name can be done whenever a collision no longer exists or receipt of the last change, for example. In the example, F1 can be renamed Y from Y.tmp. It should be appreciated that this is a simplified methodology presented for purposes of clarity. It may be the case that at 1120 multiple items need to be retrieved prior to applying the changing or renaming the then entity at 1130. Furthermore, it may be the case that many entities received need to be temporarily renamed.

For purposed of clarity and context and not limitation, FIGS. 12-15 are provided. These figures and their associated description provide exemplary situations or scenarios in which aspect of the subject invention can interact. Of course, countless other scenarios are possible which are also within the scope of the subject invention and appended claims. These specific examples are couched in terms of items and relationships, however it should be appreciated that the examples relate to all data entities. The provided examples are not meant to limit the subject invention but rather to provide a context for operation of aspects of the invention.

Figure 12A:
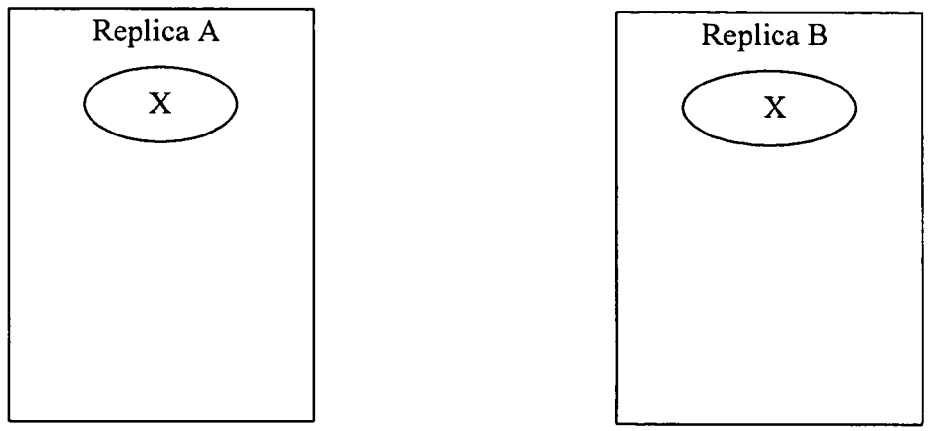
FIGS. 12a-e provide a graphical representation of an exemplary synchronization scenario with a merge in accordance with an aspect of the subject invention.
Figure 12B:
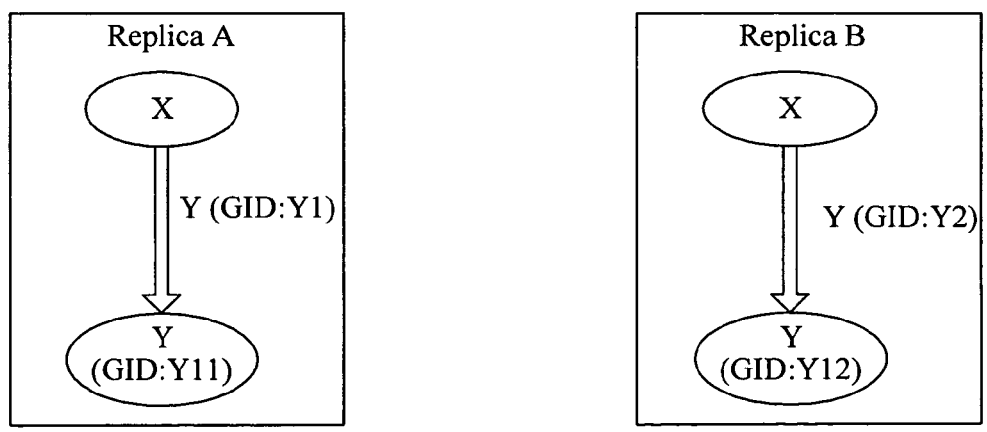
Figure 12C:
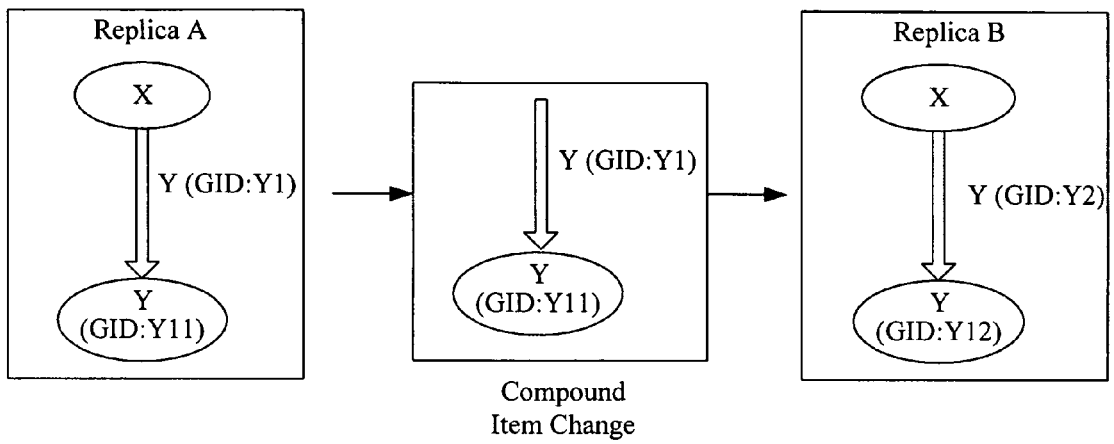
Figure 12D:
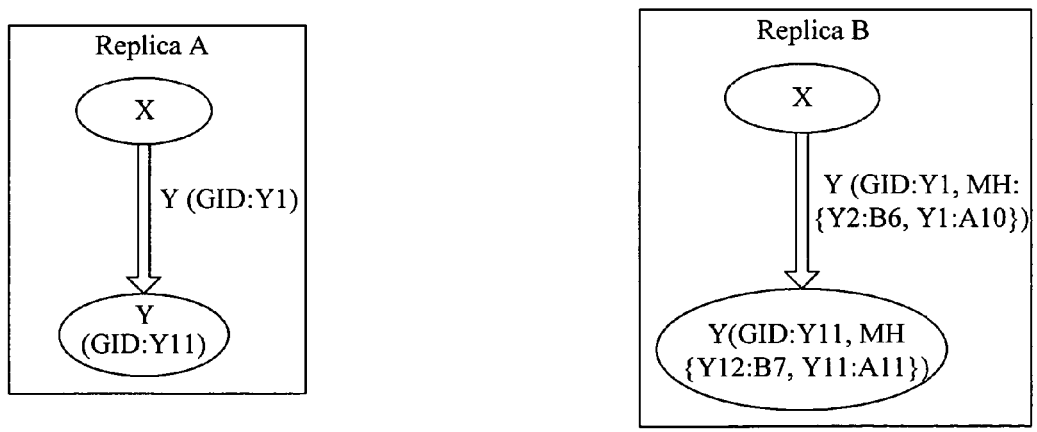
Figure 12E:
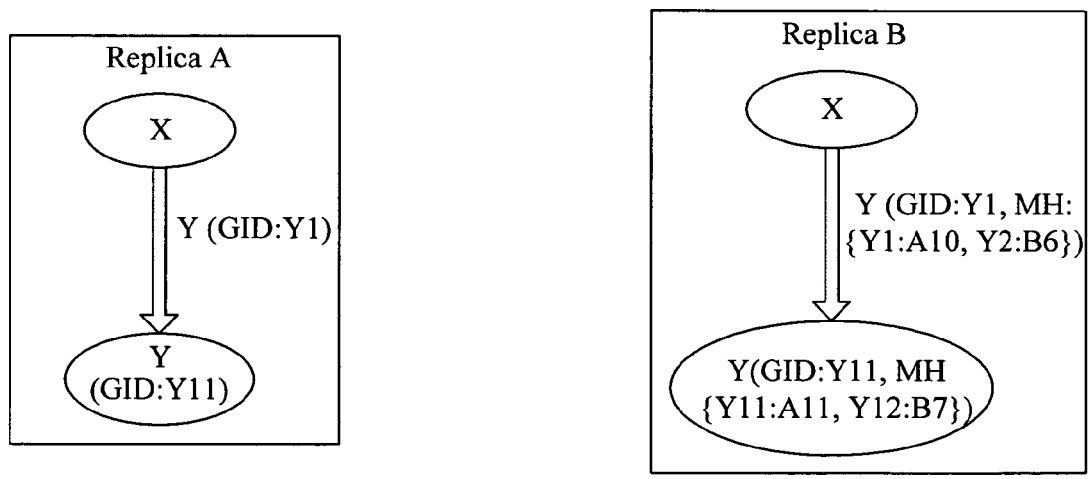

FIGS. 12*a*-12*e* provide a graphical representation of an exemplary synchronization scenario with a merge in accordance with an aspect of the subject invention. More particular, the example illustrates actions that occur during synchronization when a merge is needed. In FIG. 12*a*, two replicas A and B are provided and are synchronized. Each replica includes a folder or container X. In FIG. 12*b*, a folder or container Y is created under folder X concurrently in each of replicas A and B. Furthermore, the relationship Y between folder X and folder Y is specified as designated by the arrow. The relationship and the folder Y are each provided a unique global identifier (GID) for their respective replicas. Here, relationship Y in replica A is given a GID of Y1, while the relationship Y in replica B specified with a GID of Y2. The folder Y on replica A is given a GID of Y11 and the folder Y on replica B is specified with GID Y12. FIG. 12*c* represents a synchronization operation from Replica A to Replica B. Here a change packet or component item change is transferred to Replica B. However, there is already a relationship and folder named Y in Replica B. In accordance with an aspect of the invention a merge can be performed. FIG. 12*d* graphically illustrates the case where Replica B is the winner. The global id of the merged entity can be chosen deterministically. In this instance, it is Y1 and Y11. Both relationship Y and folder Y have merge history (MH). The merge history identifies the identifiers subsumed by the merge identifier. In this case, relationship Y has merge history Y2 and Y1. Folder Y has merge history Y12 and Y11. In the merge history, Y2 and Y12 appear before Y1 and Y11 respectively, since the winner was the one on Replica B. All properties will be that of the winner. Furthermore, a merge tombstone can be created for Y2 and Y12. Also, presented for clarity in the merge log is version information for items. FIG. 12*e* graphically presents the scenario where folder Y on Replica A wins. The global id of the merged entity is the same as in FIG. 12*d* since it was picked deterministically. In merge history, Y1 and Y11 appear before Y2 and Y12 since the winner is different.

Figure 13A:
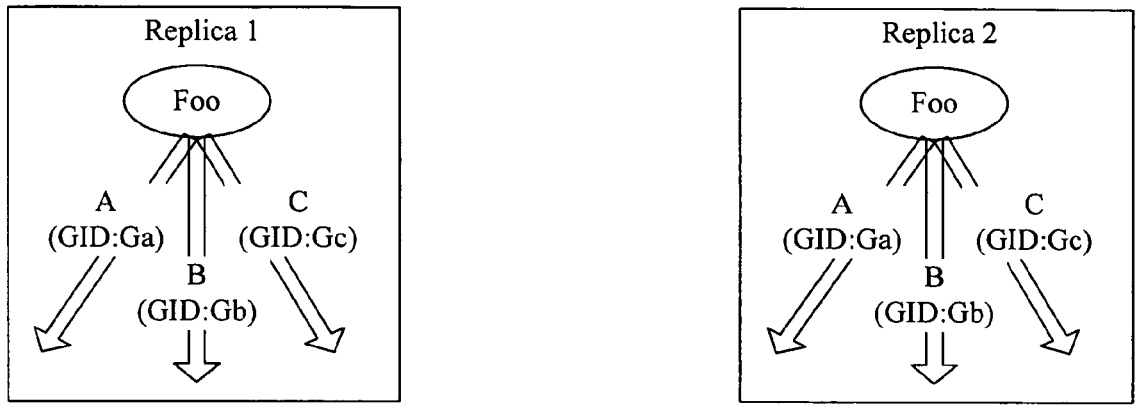
FIGS. 13a-c illustrate a graphical representation of an exemplary temporary name collision in accordance with an aspect of the subject invention.
Figure 13B:
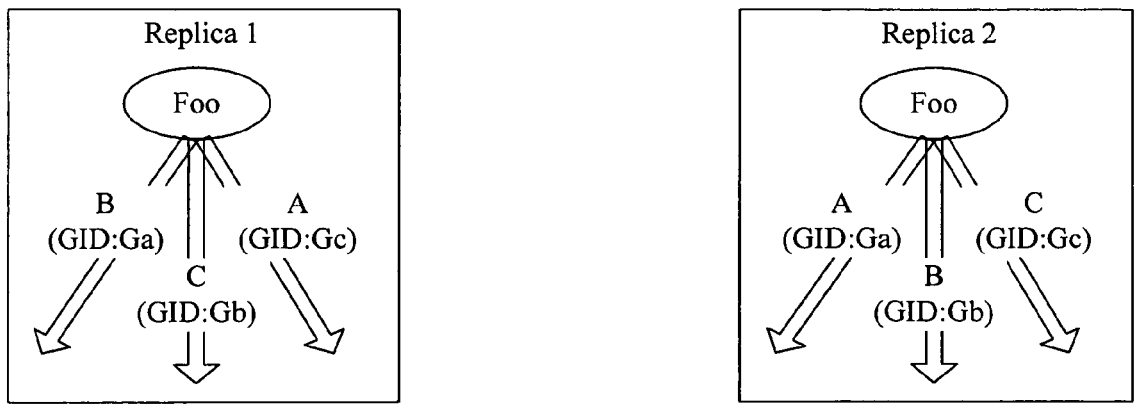
Figure 13C:
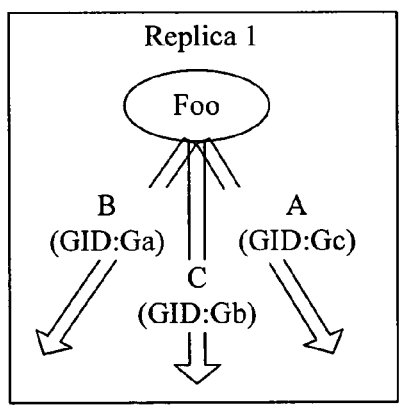
Figure 13C:
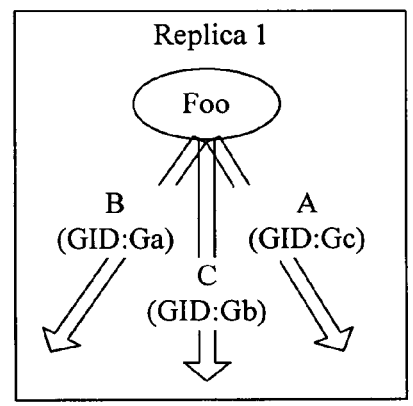

FIGS. 13*a-c* illustrate a graphical representation of temporary name collisions in accordance with an aspect of the subject invention. FIG. 13*a* provides an illustration of two replicas 1 and 2. Each replica includes an item Foo and three relationships, namely A, B, and C. Each relationship includes a global id (GID) Ga, Gb, and Gc, respectively. At this point, Replica 1 and Replica 2 are synchronized. FIG. 13b depicts a situation where there are three rename operations on Replica 1 and no changes on Replica 2. In particular, the relationship identified by Ga is changed from A to B, the relationship identified by Gb is changed from B to C, and the relationship identified by Gc is changed from C to A. There can then be a synchronization operation from Replica 1 to Replica 2. The changes enumerated are: Relationship {Ga, { }} has an update to name property, new value is "B," Relationship {Gb, { }} has an updated to name property, the new value is "C and Relationship {Gc, { }} has an updated name property where the new value is "A." When Replica 2 tries to apply these changes all of them will result in name constraint violations, and hence the changes will be delayed to the end of the change application. At such point, a cycle of name changes can be detected. To resolve this, a temporary name change can be introduced with respect to all the relationships. FIG. 13c, illustrates the completed name collision result. The synchronization operation can successfully complete all three renames utilizing an additional temporary rename for at least one of the relationships.

Figure 14A:
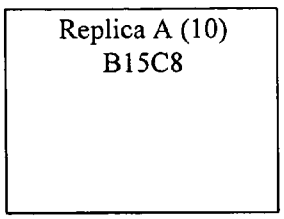
Figure 14A:
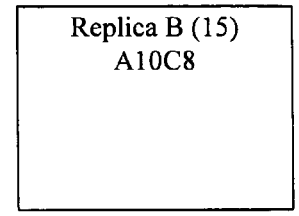
Figure 14A:
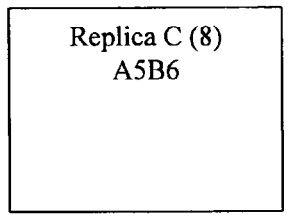
Figure 14B:
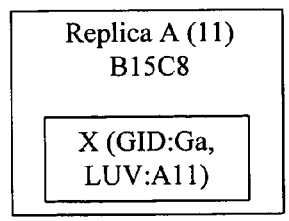
Figure 14B:
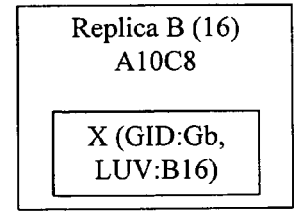
Figure 14B:
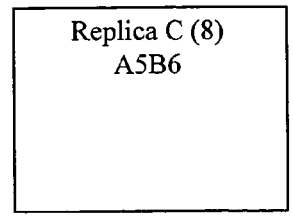

FIGS. 14a-c depict a concurrent merger situation in accordance with an aspect of the subject invention. FIG. 14a illustrates three replicas A, B, and C. Each replica's personal version or knowledge is denoted in parenthesis, while the knowledge of other replicas is indicated below in the form: replica name knowledge. FIG. 14b depicts the replicas after a relationship X is concurrently (i.e., A11, B16) created at replicas A and B. Global ids Ga and Gb are provided for the relationship X, at replicas A and B, respectively. Furthermore, each a last update version (LUV) is provided for the relationship at each of the replicas. Note the replica version or knowledge has been incremented from FIG. 14a, because of the addition of the relationship X to Replica A and Replica B. FIG. 14c shows the state of the replicas A, B and C after a synchronization from A to C and then from B to C. Note that the global id of the merge item is picked deterministically, but the properties of the merged item are that of the winner. However, the global id could also be that of the winner. The winner is given by the first global id in the merged list or history, here Ga. The last update version (LUV) prior to the merge is the in the merge history. The last update version of the merged item is a new one, here C9. Note also that Replica C's knowledge is increased and its knowledge of the other replicas updated. Now there can be a B to A synchronization. Both merge histories subsume the other and there are no updates since the merge. Hence, the winner (i.e., which last update version to keep on the merged entity) is selected deterministically.

Figure 15A:
FIGS. 15a and 15b depict a graphical representation of an exemplary merge scenario between two replicas in accordance with an aspect of the subject invention.
Figure 15B:

FIGS. 15a and 15b depict another exemplary merge scenario on two replicas in accordance with an aspect of the subject invention. FIG. 15a shows two replicas A and B, where X is created concurrently with global ids G1 and G2, respectively. The last update versions are A10 and B15. FIG. 15b illustrates a concurrent merge between replicas A and B. The policy governing the merge is local wins. Furthermore, the example assumes that G1 is before G2 in item range point. After a merge on replica A, the global id is G1, the winning item is G1, and the merge history is {{G1, {A10}}, {G2, {B15}}. After a merge on replica B, the global id is G1 since it is before G2 in range point, the winning item is G2, and the merge history is {{G2, {B15}}, {G1, {A10}}. Next time a synchronization occurs either from A to B or B to A a concurrent merge will be found. Since neither merge subsumes the other, the winner can be chosen deterministically. For example, since G1 is before G2 in item range, the merge that happened on A can be selected.

Figure 16:
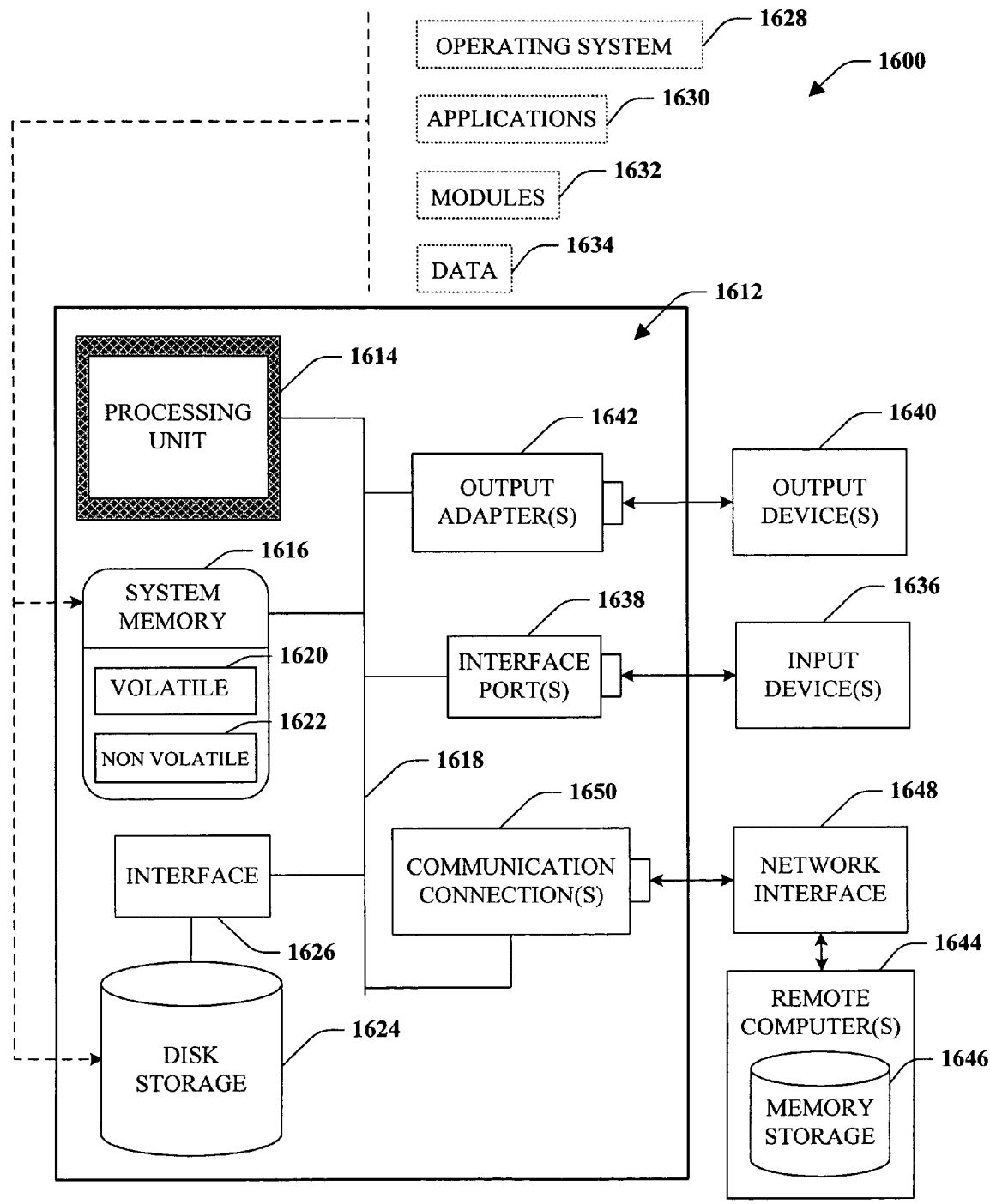
FIG. 16 is a schematic block diagram illustrating a suitable operating environment in accordance with an aspect of the present invention.
Figure 17:
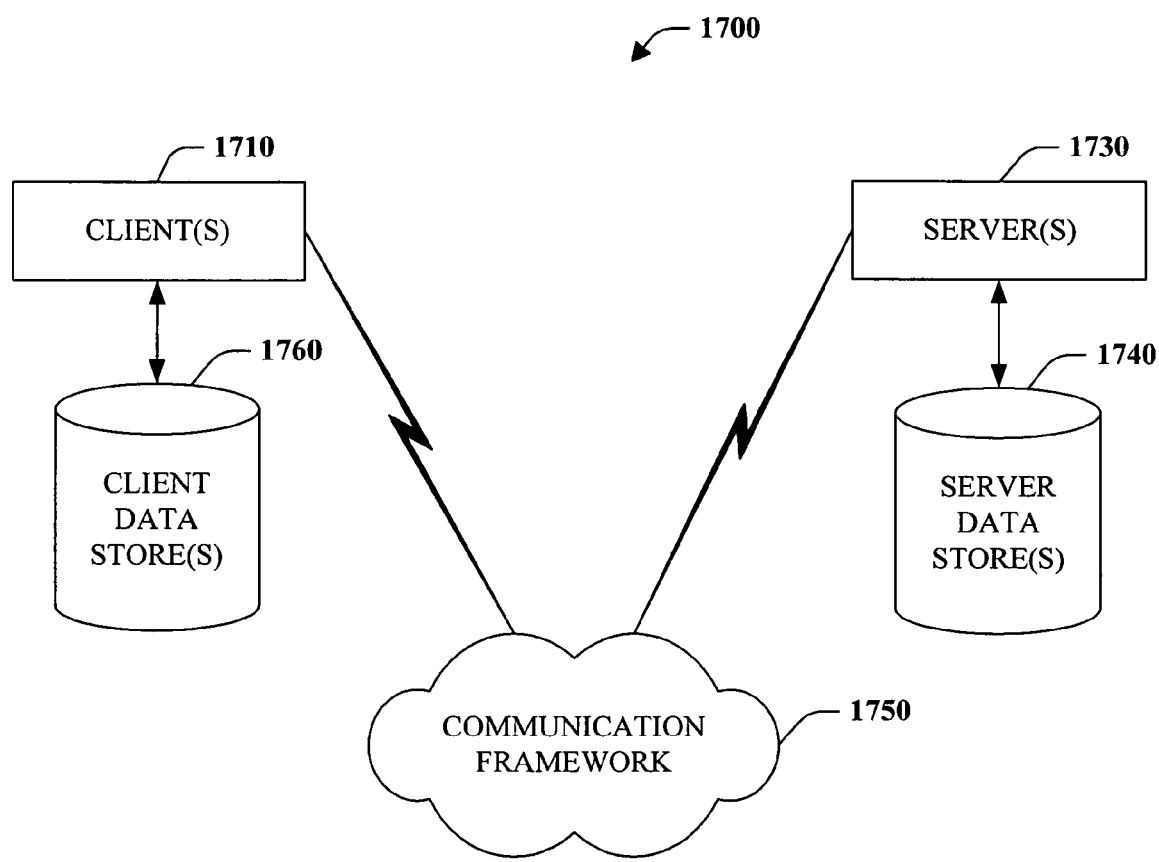
FIG. 17 is a schematic block diagram of a sample-computing environment with which the present invention can interact.

In order to provide a context for the various aspects of the invention, FIGS. 16 and 17 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 16, an exemplary environment 1600 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/nonvolatile computer storage media. FIG. 16 illustrates, for example disk storage 1624. Disk storage 4124 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the present invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612 and to output information from computer 1612 to an output device 1640. Output adapter 1642 is provided to illustrate that there are some output devices 1640 like displays (e.g., flat panel and CRT), speakers, and printers, among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereof, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems, power modems and DSL modems, ISDN adapters, and Ethernet cards.

FIG. 17 is a schematic block diagram of a sample-computing environment 1700 with which the present invention can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The server(s) 1730 can house threads to perform transformations by employing the present invention, for example. One possible communication between a client 1710 and a server 1730 may be in the form of a data packet transmitted between two or more computer processes. The system 1700 includes a communication framework 1750 that can be employed to facilitate communications between the client(s) 1710 and the server(s) 1730. The client(s) 1710 are operatively connected to one or more client data store(s) 1760 that can be employed to store information local to the client(s) 1710. Similarly, the server(s) 1730 are operatively connected to one or more server data store(s) 1740 that can be employed to store information local to the servers 1730.

What has been described above includes examples of the subject invention. It is, of course, not possible to describe every conceivable combination of components or methodologies for purposes of describing the subject invention, but one of ordinary skill in the art may recognize that many further combinations and permutations of the present invention are possible. Accordingly, the invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A computer-based data synchronization system comprising:
  a processor communicatively coupled to a memory having stored thereon data related to at least one replica involved in a synchronization event;
  a synchronization component that synchronizes between data stores two or more replicas;

a conflict component that detects constraint-based conflicts, including naming conflicts between data entities stored on the data stores, during synchronization, the conflict component includes a cycle detection component that identifies temporary conflicts associated with name collisions caused by cyclic renames by at least in part receiving knowledge associated with the data entity in question transmitted from one or more synchronization partners to facilitate determining if the conflict is temporary or permanent; and a handler component that automatically resolves the detected conflict such that when a temporary cyclic rename conflict is detected, a change or update to a named data entity participating in the synchronization is at least in part facilitated by applying said change or update to a data entity with a temporary name that is unique in the related namespace and at a later time resolving the temporary name to the named data entity, wherein the handler component comprises a merge component that specifies a single identifier for referencing one or more conflicting entities based on a merge history.

2. The system of claim 1, the conflict component detects a name constraint violation.

3. The system of claim 1, the merge component comprising a selection component facilitating selecting an identifier based on a merge policy.

4. The system of claim 3, the merge component comprising a history component that determines all the identifiers subsumed by the single identifier and stores such information as a metadata property of the single identifier.

5. The system of claim 2, the handler component including a component that renames one or more of data entities to ensure unique names are associated with entities.

6. The system of claim 2, the handler component includes a component that logs constraint conflicts to facilitate resolution at a later time.

7. The system of claim 2, the handler component including a policy component that provides rules that govern how detected conflicts should be processed.

8. A computer implemented method of synchronizing data comprising:
  detecting a constraint-based conflict, including a naming conflict between data entities, during a synchronization process, the synchronization process synchronizing one or more data stores, the detecting comprising identifying a temporary name collision conflict that corresponds to a cyclic rename, wherein the temporary name collision is identified by reviewing a synchronization partner's knowledge to determine if it is aware of a data entity name change, wherein the partner's knowledge comprises versions of the data;
  determining that a temporary violation has occurred based on the partner's knowledge of the data versions, wherein the partner's knowledge identifies which versions of data entities a partner is aware;
  resolving the conflict automatically in accordance with a resolution policy, at least in part including applying a change or update to a data entity having a temporary namespace name that is unique, wherein resolving the conflict comprises merging the entities in conflict into a single entity identified by a single identifier, the merging including specifying a merge history property of the single identifier that includes identifiers that were merged into the single identifier, wherein the conflict policy specifies one of local wins, remote wins and most recent wins.

9. The method of claim 8, detecting a constraint-based conflict comprises identifying name constraint violations in which a two or more data entities have the same namespace name and dependencies.

10. The method of claim 9, resolving the conflict comprises renaming one of the data entities.

11. The method of claim 8, a temporary name collision is identified by reviewing a synchronization partner's knowledge to determine if it is aware of a name change.

12. A data synchronization system comprising:
  a processor communicatively coupled to a memory having stored thereon computer-executable instructions configured to implement the data synchronization system including:
    a synchronization component that facilitates automatic synchronization of two or more replicas each comprising one or more data entities wherein the synchronization component detects changes between the two or more replicas;
    a conflict detection component that detects constraint-based conflicts, including naming conflicts between data entities, during synchronization, the conflict component including a detection component that (i) facilitates identifying temporary conflicts caused by cyclic renames based at least in part on additional information returned by a knowledge retrieval component that facilitates information retrieval related to a data entity in question from the relevant synchronization partner, such information indicating that a naming conflict is of a temporary scope, and (ii) facilitates identifying permanent conflicts caused by data entities with the same name or type that will conflict regardless of the order in which changes are applied to the data entities participating in the synchronization;
    a conflict handler component that automatically resolves the detected naming conflict, wherein the handler component includes a merge component that applies a unique identifier to each of the one or more data entities participating in a synchronization to ensure unique identifiers are associated with each participating data entity despite any continuing naming conflict and applying a change to a temporary data entity that is later resolved; and
    a merge policy component that facilitates automatically determining and applying a merging order for the one or more uniquely identified data entities based at least in part on the data entities name such that the merged data entities reflect at least in part the merging order in metadata comprising at least in part the unique identifier of each merged data entity.

13. A computer program product for implementing a method of synchronizing data, the computer program product comprising one or more computer storage media having stored thereon computer-executable instructions that, when executed by a processor, perform the following:
  detect a constraint-based conflict, including a naming conflict between data entities, during a synchronization process, the synchronization process synchronizing one or more data stores, the detecting comprising identifying a temporary name collision conflict that corresponds to a cyclic rename the temporary name collision is identified by reviewing a synchronization partner's knowledge to determine if it is aware of a data entity name change, wherein the partner's knowledge comprises versions of the data;
  determining that a temporary violation has occurred based on the partner's knowledge of the data versions, wherein the partner's knowledge identifies which versions of data entities a partner is aware;

resolve the conflict automatically in accordance with a resolution policy, at least in part including applying a change or update to a data entity having a temporary namespace name that is unique, wherein resolving the conflict comprises merging the entities in conflict into a single entity identified by a single identifier, the merging including specifying a merge history property of the single identifier that includes identifiers that were merged into the single identifier, wherein the conflict policy specifies one of local wins, remote wins and most recent wins.

* * * * *